United States Patent [19]

Whitford

[11] Patent Number: 4,860,779
[45] Date of Patent: Aug. 29, 1989

[54] VALVE CONTROL MEANS

[75] Inventor: Darryl R. Whitford, Rosedale, Australia

[73] Assignee: S. Smith & Son Pty. Ltd., Angaston, Australia

[21] Appl. No.: 178,915

[22] Filed: Dec. 29, 1987

[30] Foreign Application Priority Data

May 5, 1986 [AU] Australia .............................. PH5741

[51] Int. Cl.⁴ ......................... F17D 3/00; F16K 51/00; F16K 31/46
[52] U.S. Cl. .................................. 137/1; 137/624.11; 137/637; 251/229
[58] Field of Search ........... 137/1, 637, 637.1, 624.11; 251/229; 74/471 R, 471 XY

[56] References Cited

U.S. PATENT DOCUMENTS

| | | | |
|---|---|---|---|
| 552,544 | 1/1896 | Pearson | 137/637.1 |
| 599,283 | 2/1898 | De Freitas | 137/637.1 |
| 638,501 | 12/1899 | De Freitas | 137/637.1 |
| 715,758 | 12/1902 | Cooper | 137/637.1 |
| 1,538,709 | 5/1925 | Lapworth | 137/637 |
| 1,656,448 | 1/1928 | Schumacher | 137/637 |
| 1,968,422 | 7/1934 | Proctor et al. | 137/637 |
| 2,489,611 | 11/1949 | Becvar | 137/637 |
| 3,899,930 | 8/1975 | Sermanet | 137/637.1 |
| 4,694,861 | 9/1987 | Goodale et al. | 137/637 |
| 4,759,358 | 7/1988 | Gregory | 137/637.1 |

Primary Examiner—George L. Walton
Attorney, Agent, or Firm—Rodman & Rodman

[57] ABSTRACT

The valve control means includes valves arranged in a bank for controlling the flow of fluids in a winery, oil refinery or the like. The valves have operating arms located in one x-y plane. In a plane parallel to but spaced from the x-y plane there is provided an x-y plotter which has a projecting pin that can be moved adjacent to a valve arm and rotated by computer control to cause rotation of the valve arm between "on" and "off" positions. Where the valve is of the type which requires a linear withdrawal of the arm from its stem after rotation can be effected, the valve arm is provided with an abutment plate and one end is withdrawn by operation of the x-y plotter pin. A very close control of temperature, time or other requirement can be achieved automatically without requiring the attention of an operator.

4 Claims, 2 Drawing Sheets

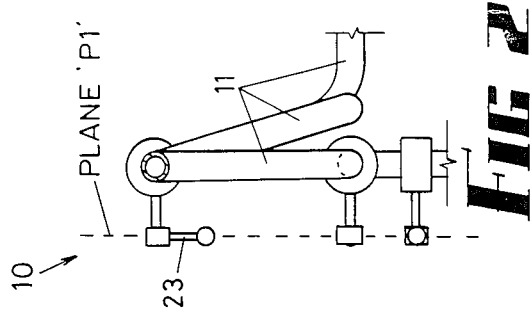
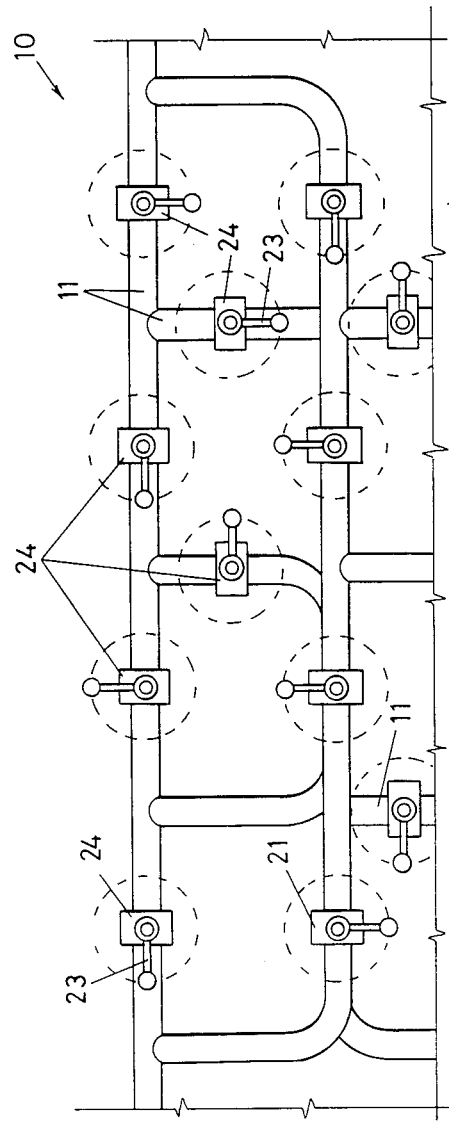
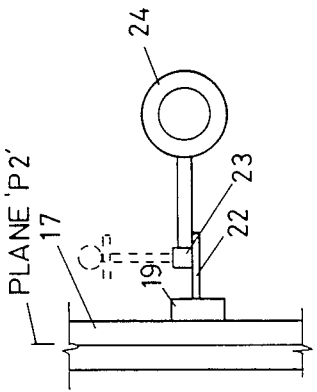
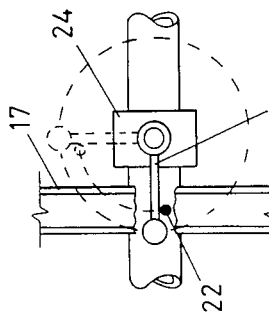

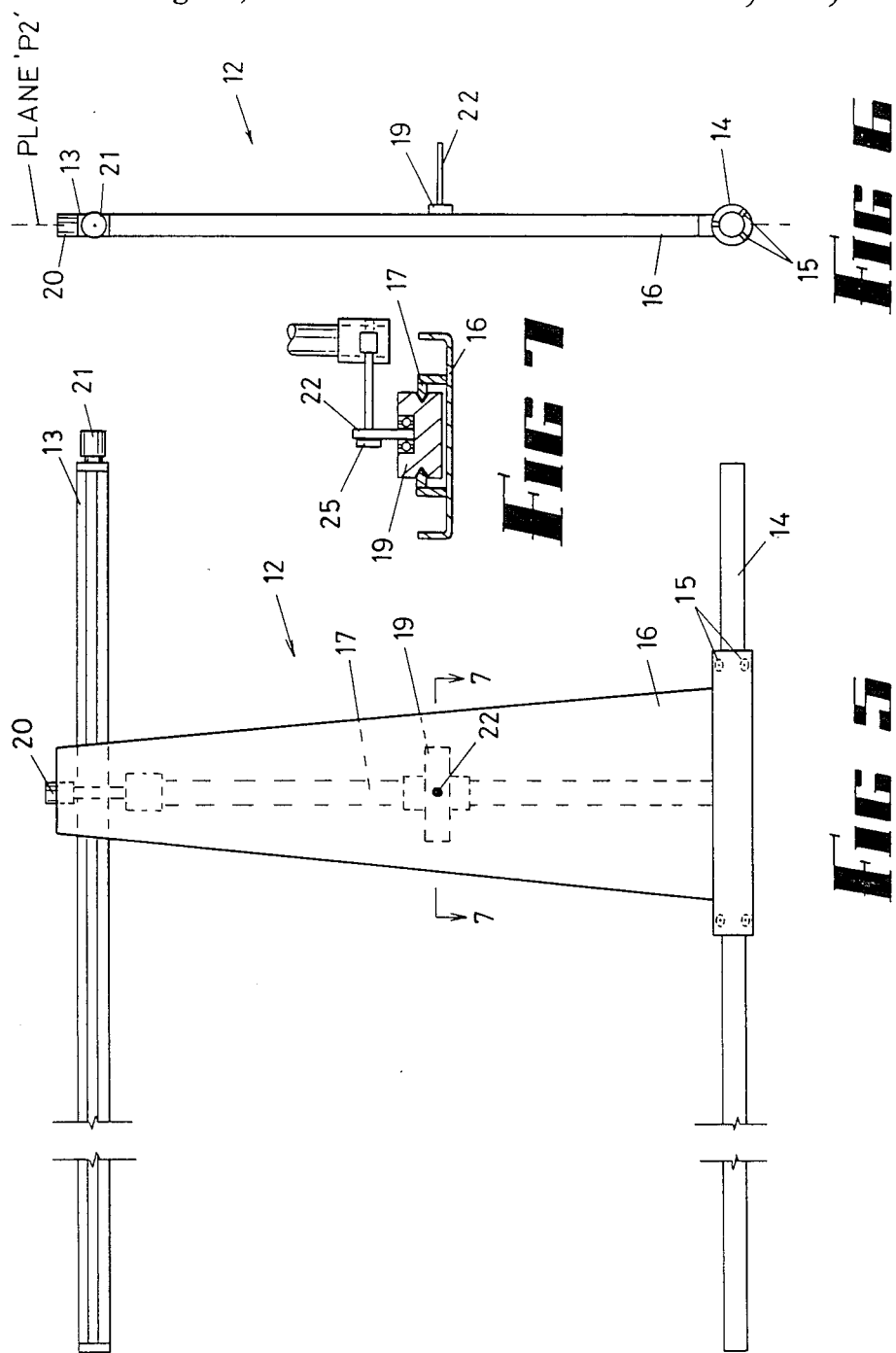

VALVE CONTROL MEANS

This invention relates to valve control means for an installation wherein a large number of valves need controlling responsive to time, temperature or other parameters which can be sensed. There are many such installations in chemical works, wineries and the like, and although not limited to valve control means in wineries, the invention is particularly applicable to such control.

In the production of wine, there is frequently a need to vary the flow of various materials, for example caustic soda solution, steam, hot water, citric acid, brine and other materials which are used in wine making, and a wine maker sometimes requires to vary the treatment quite considerably, for example the amount of caustic soda which is introduced, the amount of steam and the time at which it is introduced, whether there is a requirement for simultaneous injection of more than one reagent or other additive, and the range of temperature which it is desired to maintain during the fermentation process.

In a typical installation, a wine tank may have about thirty valves, and in some instances these valves are the type wherein the valve stem is first withdrawn in an axial direction, and then rotated, being released to be returned in a reverse axial direction under spring pressure. Such valves are available from a number of different manufacturers, including valves sold under the Registered Trade Mark "ALPHA LAVAL". However, for use in this invention, it is desirable that the valves should be only rotatable so as to avoid the additional function of withdrawing the stem, even though such withdrawal can be in the "X" or "Y" direction.

In an embodiment of this invention, a plurality of valves are arranged with their respective operating arms in a first vertical plane, a pair of parallel spaced rails, a carriage carried by the rails for movement thereon in a second plane parallel to the first, a guide on a carriage which is at right angles to the rails, a slide carried on the guide, a valve actuating pin projecting from the slide to intersect the first plane, and drive means arranged to move the carriage and move the slide in accordance with a programmed input control. The drive means can for example comprise stepping motor and screw assemblies, or some electrical equivalent thereto such as for example a servo motor with perforated band and sprocket power transmission means.

Devices such as those described above are generally known in the trade as "x-y plotters", and the controls therefor can be programmed with a computer programme to be responsive to specific requirements. For example where temperature is sensed, the controls can be responsive to changes of ±0.5° C. Further to that, the sensing can be responsive not merely to temperature but also to rate of temperature variation. Very close tolerances can also be achieved for all of the required reagents or additions or heating or refrigeration means. "x-y plotters" are also programmable to rotate the slide about on axis of rotation normal to direction of carriage movement.

An embodiment of the invention is described hereunder in some detail with reference to, and is illustrated in, the accompanying drawings, in which:

FIG. 1 is a partial front elevation of a bank of valves as used to control various functions of the processing of wine;

FIG. 2 is an end elevation of FIG. 1;

FIG. 3 is a front elevation (to a larger scale) showing the manner in which a valve is rotated;

FIG. 4 is an end elevation of FIG. 3;

FIG. 5 is a front elevation of an x-y plotter used to control valve rotation;

FIG. 6 is an end elevation of FIG. 5; and

FIG. 7 is a section on line 7.7 FIG. 5, but drawn to a larger scale.

In this embodiment, a bank of valves (about thirty in number although only twelve are shown) is arranged with a series of manifolds 11, both for introducing reagents to a tank and also for controlling heating or chilling of the tank by means of flow of hot or cold water through a temperature control jacket or heat exchange coils within a tank (not shown). The operating arms 23 of the valves 24 all lie in and rotate within an 'x-y' plane "P1".

Each of a plurality of sensors is coupled to the input of a computer, and the computer is so programmed as to be responsive to change of requirements. This is not illustrated, being only peripheral to the invention. For example, a reduction in temperature will cause the flow of steam or hot water through heating coils within the tank; an increase in temperature will cause the application of refrigerated fluid to a surrounding jacket for chilling the tank. However not merely is the temperature sensed, but also the rate of change by relating the temperature, and the sensed information is fed into the input of the computer, so that a reducing temperature is corrected before the temperature actually passes outside of the required range, and the same principles are applied to the other sensing means, for example for addition of reagents.

An "x-y plotter" 12 comprises a pair of spaced parallel rails 13 and 14 which lie in an 'x-y' plane 'P2' parallel to plane 'P1'. Rails 13 and 14 guide respectively a slide and the wheels 15 of a carriage 16 for movement in an 'x' direction, the carriage 16 having a linear track type guide 17 which extends in a 'y' direction at right angles to the rails, 13 and 14, and the guide 17 carries on it a slide 19 (or the mechanical equivalent thereto), for movement in the 'y' direction, effected by a stepping motor 20 on the carriage 16, while the 'x' direction movement is controlled by a second stepping motor 21 which drives a screw through a reduction gearbox, the screw engaging a nut on the carriage to effect fore and aft movement. (This is not illustrated in detail). The stepping motors 20 and 21 thereby effect movement of an outstanding pin 22 on the slide which extends in a 'z' direction to engage either above or below, or alternatively to one side or the other, of the arm 23 of each respective valve 24. With some valves it is necessary for the motion to be also programmed to firstly withdraw the arm 23 from the stem for the valve to be rotatable. In both instances the pin 22 is caused to move simultaneously in both x and y directions so as to cause rotation of the valve to its new position, but the illustrated arrangement is preferred, because there is no need for initial withdrawal movement.

Operation of the stepping motors 20 and 21 is controlled by the computer, programmed to cause the pin 22 to first move adjacent the arm 23 required to be moved, and then to cuase the pin 22 to follow a circular transverse as shown in FIG. 3 to cause the valve to rotate (usually by 90°), but multi-turn valves may also be operated by the method.

If valve stem withdrawal is also required, it is desirable to replace the knob on the end of each valve handle with a flat plate 25. The pin 22 is moved to one side of the handle and past the plate (say in an 'x' direction) then moved in a 'y' direction to contact the handle, reversed in the 'x' direction to withdraw the handle, and then rotated.

One advantage of the invention is that is saves a considerable amount of labour, and reduces the danger of human error. Another advantage is that the total installation costs are less than automatically operated solenoid valves which are located remotely from one another (an arrangement which is sometimes used), and the control may be effected at any time during day or night by automatic means, while the requirements of temperature of reagent can be maintained within close tolerances.

What is claimed is:

1. Valve control means for control of operation of a plurality of valves having operating arms, comprising an arrangement of said valves wherein their respective operating arm are rotatable in a first 'x-y' plane, a pair of parallel spaced rails, a carriage carried by the rails for movement thereon in an 'x' direction in a second x-y plane parallel to the first x-y plane, a guide on the carriage at right angles to the rails, a slide movable along the guide in a 'x' direction, a valve actuating pin projecting from the slide in a 'z' direction to intersect the first plane, and drive means arranged to move the carriage and the slide simultaneously in accordance with a programmed input control to vary the position of the slide in the x and y directions such that the valve actuating pin can be aligned with any selected valve arm to selectively engage any one of the valve arms and rotate the selected engaged valve arm by simultaneous movement of the carriage and the slide after said alignment of the actuating pin with the selected valve arm has been effected.

2. Valve control means according to claim 1 wherein said drive means include a pair of stepping motors carried respectively one of said rails and by said carriage, one of said stepping motors being operable to effect motion of the valve actuating pin in the 'x' direction and the other of said stepping motors being operable to effect motion of the valve actuating pin in the 'y' direction, each said stepping motor being computer controlled to control movement of said valve actuating pin to selectively engage any one of the arms of said valves.

3. Valve control means according to claim 1 wherein each of said valve arms terminates in a abutment plate, and said actuating pin is engageable against selected ones of said arms and movable to abut the abutment plate to effectuate withdrawal of the arm before effecting said parital rotation.

4. A method of controlling a plurality of valves in an arrangement of valves wherein their respective operating arms are rotatable in a first 'x-y' plane, comprising driving a carriage of an x-y plotter in an 'x' direction of a second 'x-y' plane which is parallel to the first 'x-y' plane by a stepping motor, driving a slide on the carriage by a stepping motor on the carriage, in a 'y' direction of said second plane such that driven movement of the carriage in the 'x' direction and driven movement of the slide in the 'y' direction is operable to vary the position of the slide in the 'x' and 'y' directions, engaging selective ones of said arms in a predetermined sequence by a valve actuating pin which projects from said slide to intersect the first said plane, such that the valve actuating pin can be aligned with any selected valve arm in accordance with the positional movement of the slide and rotating said valve arm about a 'z' axis after said alignment of the actuating pin with the selected valve arm has been effected by controlling operation of said stepping motors.

* * * * *